Figure 1:
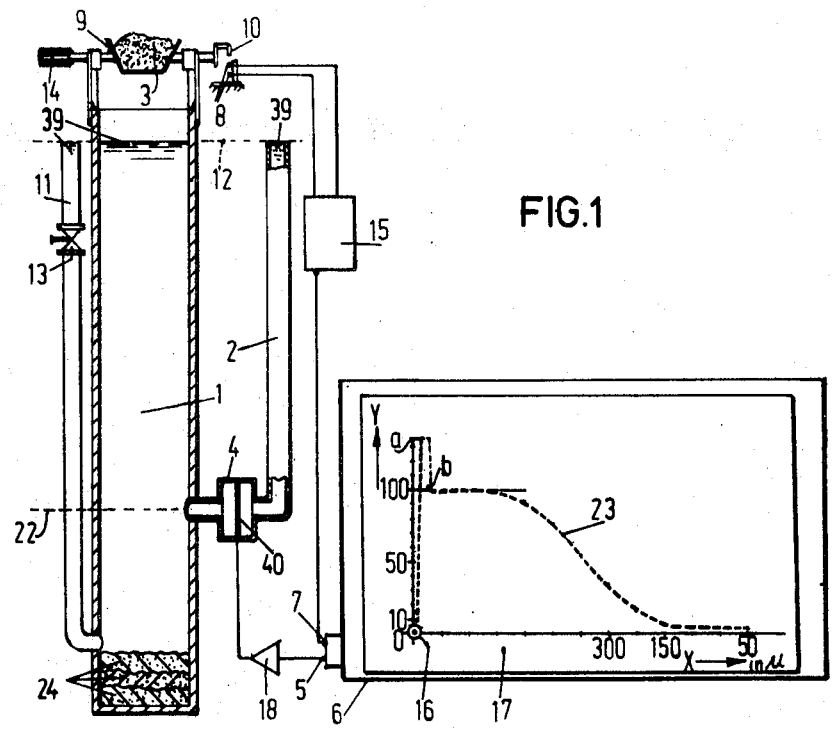

United States Patent [19]
Hartman

[11] 3,788,146
[45] Jan. 29, 1974

[54] DEVICE FOR ANALYSING THE GRAIN CLASSIFICATION OF A SOIL SAMPLE

[75] Inventor: Cornelius Hartman, Vreeswijk, Netherlands

[73] Assignee: Ballast-Nedam Groep N.V., Amsterdam, Netherlands

[22] Filed: May 9, 1972

[21] Appl. No.: 251,829

[52] U.S. Cl................. 73/432 R, 73/61.4, 73/438
[51] Int. Cl. .......................................... G01n 15/06
[58] Field of Search........ 73/432 R, 61 R, 61.4, 438

[56] References Cited
UNITED STATES PATENTS
3,085,441  4/1963  Sarian............................. 73/438 X FOREIGN PATENTS OR APPLICATIONS
157,829  10/1962  U.S.S.R............................... 73/438
1,032,490  6/1966  Great Britain....................... 73/438

Primary Examiner—Richard C. Queisser
Assistant Examiner—Joseph W. Roskos
Attorney, Agent, or Firm—Snyder, Brown and Ramik

[57] ABSTRACT

A device for analysing the grain classification of soil samples includes sedimentation and compensation pipes, both of which are filled to a common level with liquid. A pressure difference pick up device connects the compensation pipe to the sedimentation pipe at a region above the lower end of the latter and provision is made for dumping a soil sample into the sedimentation pipe. After the sample is dumped, the levels of liquid in the two pipes are equalized either by means of an overflow pipe and stop valve connected with the sedimentation pipe or by a throttle flow connection between the two pipes.

10 Claims, 2 Drawing Figures

PATENTED JAN 29 1974 3,788,146

DEVICE FOR ANALYSING THE GRAIN CLASSIFICATION OF A SOIL SAMPLE

The invention relates to a device for analysing the grain classification of a soil sample, comprising a pressure difference pick up positioned between a sedimentation pipe and a compensation pipe, which pressure difference pick up is connected to a registrator and comprises a measuringmembrane separating the liquid of the sedimentation pipe from the liquid of the compensation pipe.

Such a device is known.

During analysing a soil sample with the known device the grain classification is determined by measuring the fall velocity of the grains. When the soil sample is dumped into the sedimentation pipe the level of the liquids in the sedimentation pipe raises in dependence on the volume of the soil sample, so that the measured value picked up by the pressure difference pick up is dependent from this volume. Moreover the measuring membrane of the pressure difference pick up is preloaded by the rise of the level. The pressure difference pick up is less sensitive when measuring small quantities because of this pre-load.

The invention improves the device of the above mentioned kind in this respect by levelling means for levelling the levels of the liquids in the compensation pipe and the sedimentation pipe. The rise of level in the compensation pipe and the sedimentation pipe is therefore similar, so that the measuring membrane of the pressure difference pick up comes at both sides under the influence of an equal increase of the hydrostatic pressure.

If the registrator is carried out as an X-Y recorder, this X-Y recorder registrates a graph independent on the volume of the soil sample and reproducing immediately the grain classification proportionally.

In order to measure the volume of a soil sample the levelling means preferably comprise a stop valve.

Preferably the pressure difference pick up is connected to a tactile point of the sedimentation pipe situated above the lower end thereof. Then the value picked up by the pressure difference pick up decreases in dependence on the grains passing by the tactile point.

The above mentioned and other features according to the invention will be elucidated in the following description with reference to a drawing.

Figure 2:
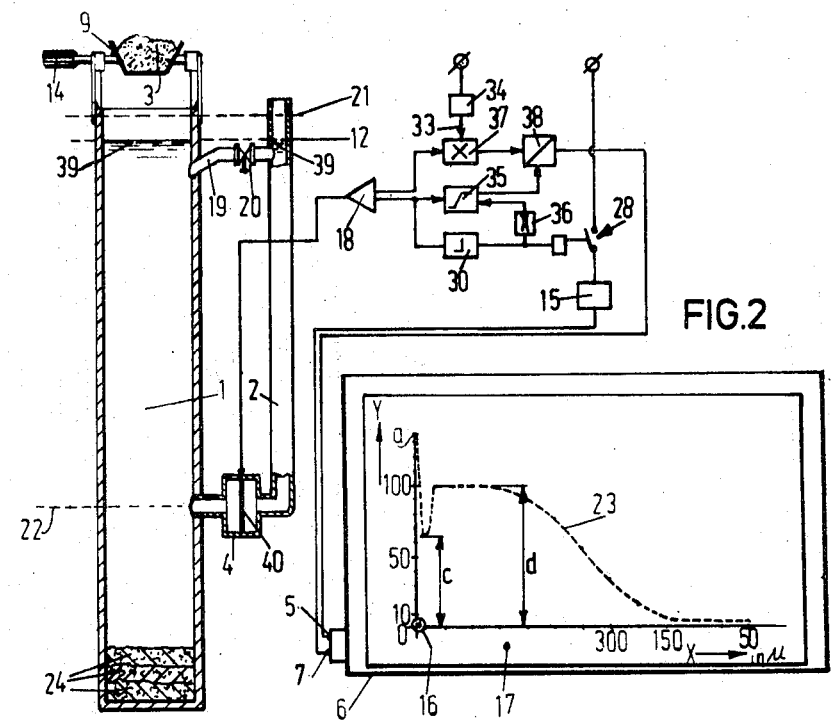

FIGS. 1 and 2 of the drawing each show schematically a device according to the invention.

The device of FIG. 1 comprises a sedimentation pipe 1 filled with water 39, a compensation pipe 2, also filled with water 39, a pressure difference pick up 4 positioned there between and having a measuring membrane 40 separating the water 39 of the sedimentation pipe 1 from the water of the compensation pipe 2. The electrical signal given by the measuring membrane 40 dependent on the deformation of the measuring membrane 40 is connected via an amplifier 18 to the Y-input of a registrator carried out as X-Y recorder.

The X-input 7 of the X-Y recorder 6 is connected to a voltage generator 15 delivering a voltage varying logarithmically and proportionally with the time and which voltage generator is switched on by means of a switch 8.

A swivelling holder 9 for receiving the soil sample to be analysed lies on the sedimentation pipe 1. The holder 9 is attached to a handle 14 and an operation lever 10 for closing the switch 8.

The sedimentation pipe 1 communicates with an overflow pipe 11, which overflow pipe reaches to the level 12 as well as the compensation pipe 2 and which overflow pipe constitutes levelling means for levelling the levels of the sedimentation pipe 1 and the compensation pipe 2. The overflow pipe 11 comprises a stop valve 13.

Analysing the soil sample 3 by means of this device takes place as follows:

Initially the sedimentation pipe 1, the compensation pipe 2 and the overflow pipe 11 are all filled with water to level 12, the stop valve 13 is closed and the holder 9 comprises a washed and weighed soil sample 3. By swivelling the holder 9 with the hand at handle 14 the soil sample 3 is dumped into the sedimentation pipe 1 and the voltage generator 15 is started at the same time by closing the switch 8, so that the pen 16 moves now logarithmically in X-direction over the paper 17 positioned on the X-Y recorder 6. By increase of the weight of the column in the sedimentation pipe 1 with the weight of the soil sample 3 the pressure difference picked up by the pressure difference pick up 4 increases initially, which can be observed as a large Y-deflection $a$ of pen 16. Soon after this deflection $a$ stop valve 13 is opened and the level of the water 39 in the sedimentation pipe 1 sinks to level 12 by overflow of water through the overflow pipe 11. This results in a decrease of the Y-deflection to Y-deflection $b$. From this difference $a - b$ the total soil volume of the soil sample 3 can be calculated.

FIG. 2 shows a device according to the invention which inter alia differs in construction and operation from the device according to FIG. 1 in that the levelling means of FIG. 2 are constituted by a connecting pipe 19 with a throttle 20 instead of by an overflow pipe 11 so that the water levels in the pipes 1 and 2 come with some delay to the same level 21 and the pressure difference pick up 4 is discharged of a pre-tension resulting from a level difference. During dumping the soil sample 3 into the sedimentation pipe 1 the pressure pick up 4 picks up a pressure impulse, which when exceeding an adjusted value, closes the switch 28 via a high pass filter 30 resulting in starting of the voltage generator 15, so that the X-input 7 of the X-Y recorder 6 is fed with a longitudinally and proportionally increasing voltage.

In the FIGS. 1 and 2 the pressure difference pick up 4 is under the influence of each grain found in the sedimentation piep 1 over its level. As soon as a grain passes by this level 22, the pressure difference and with that the Y-deflection decreases. The Y-deflection is a measure for the percentage of soil found above the level 22 said coil consisting of grains smaller than grains passing the level 22. The decrease of this percentage is shown in the graph 23. For obtaining a fixed maximum deflection with is independent on the volume of the sample the initial deflection $c$ is compared with a built-in signal 33 of a potential meter 34 corresponding with the fixed deflection $d$ of 100 percent. The subsequent signals are multiplied by the ratio between deflection $c$ and the fixed deflection $d$. For this purpose the amplifier 18 is connected to a store 35, the built-in relay of which is excited, after a period of time adjusted in a retarder 36 of e.g., 2 seconds has elapsed, since the passing by of a signal through the high pass filter 30. The constant signal stored in the store 35 after this period of time corresponds with 100 percent of the soil sample. During falling of the grains the amplified signal of the pressure difference pick up 4 decreases. This varying signal is multiplied in the multiplier 37 with a fixed adjusted value 33 of the potential meter 34, divided in the divisor 38 by the output signal of the store 35 and supplied to the Y-input 5 of the X-Y recorder 6. As the relation between the fall velocity of the grains and their size is known, it is known for each point of time during analysis which size the grains passing by the level 22 have. This size of the grains is reproduced at the X-axis in $\mu$. The graph 23 represents the grain classification of the soil sample 3.

As the pressure difference pick up at 4 at a level 22 above the lower end is connected to the sedimentation pipe 1, it is not objectionable if there are under in the sedimentation pipe 1 analysed soil samples 24 yet. As a result it is not necessary to clean the sedimentation pipe 1 each time after analysis.

The registrator can be carried out as a digital registrator instead of an X-Y recorder.

I claim:

1. A device for analysing the grain classification of soil samples comprising, in combination:
   a vertically disposed sedimentation pipe having a closed lower end;
   a vertically disposed compensation pipe;
   a pressure difference pick up device connecting said compensation pipe with said sedimentation pipe, said sedimentation pipe and said compensation pipe being filled with liquid to a common height which is above said pressure difference pick up device;
   measuring means connected with said pressure difference pick up device for measuring pressure differences sensed thereby;
   means for dumping a soil sample into the liquid in said sedimentation pipe; and
   levelling means for equalizing the levels of liquid in said sedimentation and compensation pipes after a soil sample has been dumped and during measurement by said measuring means.

2. A device according to claim 1 wherein said levelling means comprises a flow connection between said compensation pipe and the upper region of said sedimentation pipe.

3. A device according to claim 2 wherein said flow connection includes a throttle.

4. A device according to claim 1 wherein said levelling means comprises an overflow pipe connected to said sedimentation pipe.

5. A device according to claim 4 wherein said levelling means further comprises a stop valve in said overflow pipe.

6. A device according to claim 5 wherein said pick up device communicates with said sedimentation pipe at a point above said lower end of the sedimentation pipe.

7. A device according to claim 4 wherein said pick up device communicates with said sedimentation pipe at a point above said lower end of the sedimentation pipe.

8. A device according to claim 3 wherein said pick up device communicates with said sedimentation pipe at a point above said lower end of the sedimentation pipe.

9. A device according to claim 2 wherein said pick up device communicates with said sedimentation pipe at a point above said lower end of the sedimentation pipe.

10. A device according to claim 1 wherein said pick up device communicates with said sedimentation pipe at a point above said lower end of the sedimentatin pipe.

* * * * *